United States Patent
Da Silva et al.

(10) Patent No.: US 11,404,934 B2
(45) Date of Patent: Aug. 2, 2022

(54) SYSTEM FOR COMPENSATING FOR THE STRESSES APPLIED TO A BEARING SUPPORTING A ROTOR SHAFT OF A ROTATING MACHINE

(71) Applicant: SKF Magnetic Mechatronics, Saint-Marcel (FR)

(72) Inventors: Joaquim Da Silva, Sennely (PT); Joel Mouterde, Blaru (FR)

(73) Assignee: SKF Magnetic Mechatronics, Saint-Marcel (FR)

( * ) Notice: Subject to any disclaimer, the term of this patent is extended or adjusted under 35 U.S.C. 154(b) by 0 days.

(21) Appl. No.: 17/176,202

(22) Filed: Feb. 16, 2021

(65) Prior Publication Data
US 2021/0305881 A1    Sep. 30, 2021

(30) Foreign Application Priority Data

Mar. 24, 2020  (FR) ...................... 2002848

(51) Int. Cl.
   *H02K 7/09*   (2006.01)
   *F16C 32/04*  (2006.01)

(52) U.S. Cl.
   CPC .......... *H02K 7/09* (2013.01); *F16C 32/0442* (2013.01); *F16C 32/0446* (2013.01); *F16C 32/0457* (2013.01); *F16C 32/0489* (2013.01)

(58) Field of Classification Search
   CPC ... H02K 7/09; F16C 32/0442; F16C 32/0446; F16C 32/0457; F16C 32/0489;
   (Continued)

(56) References Cited

U.S. PATENT DOCUMENTS

| 2013/0188897 A1* | 7/2013 | Reedman ................ F16C 33/30 384/448 |
| 2018/0328375 A1 | 11/2018 | Betschart et al. |
| 2019/0120290 A1* | 4/2019 | Jung ........................ H02K 7/09 |

FOREIGN PATENT DOCUMENTS

| EP | 2507605 B1 | 3/2018 |
| JP | H08277845 | * 10/1996 |

(Continued)

OTHER PUBLICATIONS

Jarir Mahfoud, Johan Der Hagopian. Investigations on the critical speed suppressing by using electromagnetic actuators. smarts structures and systems, 2012, 9 (4), pp. 303-311. <hal-00824272>.

(Continued)

*Primary Examiner* — Ahmed Elnakib
(74) *Attorney, Agent, or Firm* — Garcia-Zamor Intellectual Property Law; Ruy Garcia-Zamor; Bryan Peckjian

(57) ABSTRACT

A system for compensating for the stresses applied to a bearing that rotatably supports a rotor shaft of a rotating machine relative to a stator of the machine. The system provides at least one sensor for measuring an input signal positioned on an element of the bearing, a module for acquiring the input signal configured to convert the input signal into a value of the deformation applied to the rolling bearing, a module for determining a compensation signal as a function of the deformation value, and an amplifier module configured to control a magnetic actuator rotatably supporting the shaft of the rotor and including at least one electromagnet, the amplifier module being configured to convert the compensation signal into a voltage signal transmitted to the electromagnet of the magnetic actuator, the magnetic actuator being configured to exert a force on the rotor shaft as a function of the voltage signal.

18 Claims, 3 Drawing Sheets

(58) Field of Classification Search
CPC .... F16C 17/24; F16C 32/0476; F16C 32/048;
F16C 2233/00; F16C 2300/02; F16C
2360/31; F16C 19/52; F16C 32/0444;
F16C 32/0451; F16C 39/06; F16C
19/522; G01L 5/0009; Y02E 10/72
USPC ........................................................ 310/90.5
See application file for complete search history.

(56) References Cited

FOREIGN PATENT DOCUMENTS

| | | |
|---|---|---|
| JP | H08277845 A | 10/1996 |
| WO | 2010136264 A1 | 12/2010 |

OTHER PUBLICATIONS

On the Use of Flexibly-Mounted, Internal-Stator Magnetic Bearings for Vibration Control of a Flexible Rotor, C. Lusty1 and P. Keogh1, Medyna 2017: 2nd Euro-Mediterranean Conference on Structural Dynamics and Vibroacoustics, Apr. 25-27, 2017 Sevilla (Spain), 1Department of Mechanical EngineeringUniversity of Bath, United KingdomEmail: C.Lusty@bath.ac.uk, P.S.Keogh@bath.ac.uk.

* cited by examiner

The voltage signal is known as "pulse width modulation" or PWM.

In no way limitatively, provision could be made for the acquisition module to also be configured to convert the deformation signal into a signal of the loads applied to the rolling bearing.

The compensation signal transmitted to the magnetic actuator makes it possible to generate a force on the rotor shaft and thus reduce the load applied to the bearing.

There is thus real-time knowledge of the deformation and/or loads exerted on the bearing in order to compensate for them at least partially through the use of at least one magnetic actuator.

Advantageously, the amplifier module comprises a control module configured to determine a duration of the pulses of the voltage signal to be transmitted to the electromagnet of the magnetic actuator as a function of the compensation signal, and a power module configured to supply the necessary current to the electromagnet of the magnetic actuator in order to apply the voltage.

The module for determining a compensation signal comprises an electronic control unit configured to receive the deformation value coming from the acquisition module and convert it into a force command, and a converter configured to convert the force command into a compensation signal.

The electronic control unit can be a closed-loop control system such as a proportional—integral—derivative, or PID, controller, delivering for example a force signal in digital or analogue form.

For example, the compensation signal is a current compensation signal or a flux compensation signal.

Conversion into a compensation signal on the basis of a force command is known to a person skilled in the art and will not be described further.

For example, the bearing is of the rolling bearing type comprising an inner ring rigidly connected to the cylindrical outer surface of the rotor, an outer ring assembly comprising an outer ring and a casing mounted around the outer ring, and a plurality of rolling elements positioned radially between the rings.

For example, the rolling elements are balls. As a variant, other types of rolling elements could be envisaged, such as for example rollers, needles, etc. Two or more rows of rolling elements could also be envisaged. For example, the bearing is a conical bearing.

For example, the inner ring is solid and is delimited radially by an inner cylindrical surface and an outer cylindrical surface and axially by two opposite frontal radial surfaces. The inner ring can include, on its outer cylindrical surface, a ring groove forming a raceway for the rolling elements.

For example, the outer ring is solid and is delimited radially by an inner cylindrical surface and an outer cylindrical surface and axially by two opposite frontal radial surfaces. The inner cylindrical surface of the outer ring can form a ring groove forming a raceway for the rolling elements.

According to one embodiment, the magnetic actuator is an axial magnetic bearing axially supporting the rotor shaft.

For example, the axial magnetic bearing comprises a stator core and a rotor core in the form of a disc rigidly connected to the rotor shaft, the stator core comprising a stator magnetic circuit including at least one annular winding and a ferromagnetic body surrounding the winding, and the rotor comprising at least one ferromagnetic part.

According to another embodiment, the magnetic actuator is a radial magnetic bearing radially supporting the rotor shaft.

SYSTEM FOR COMPENSATING FOR THE STRESSES APPLIED TO A BEARING SUPPORTING A ROTOR SHAFT OF A ROTATING MACHINE

CROSS-REFERENCE TO RELATED APPLICATIONS

This application claims priority to French Patent Application no. 2002848, filed Mar. 24, 2020, the contents of which is fully incorporated herein by reference.

TECHNICAL FIELD OF THE INVENTION

The present invention relates to the general field of rotating machines, and more particularly to rotating machines subject to static and/or transient loads, such as for example wind turbines.

BACKGROUND OF THE INVENTION

Rotating machines generally comprise a rotating shaft supported by at least one bearing, for example a rolling bearing or a magnetic bearing.

It is known practice to control magnetic bearings as a function of a displacement relative to the rotor.

More particularly, the present invention relates to systems for compensating for the loads applied to the rolling bearing supporting the rotating shaft.

The service life of current rolling bearings is considerably affected by the static and variable loads applied.

In order to ensure the satisfactory operation of the rolling bearings and improve the service life thereof, it is known practice to use sensors to monitor the bearing, and in particular to detect the load transmitted to the bearing.

The deterioration of the rolling bearing can thus be detected and maintenance steps can be anticipated.

Reference can be made in this respect to EP 2 507 605-B1.

However, monitoring the state of the rolling bearing does not make it possible to avoid the deterioration of the bearing, but only to anticipate maintenance operations.

There is a need to improve the reliability of rolling bearings by limiting the deterioration thereof.

SUMMARY OF THE INVENTION

The present invention applies particularly to the field of bearings, such as rolling bearings, for example ball bearings, roller bearings and needle bearings.

The invention relates to a system for compensating for the stresses applied to at least one bearing suitable for rotatably supporting a rotor shaft of a rotating machine relative to a stator of the machine. The system comprises at least one sensor for measuring an input signal and positioned on at least one element of the bearing, a module for acquiring the input signal configured to convert the input signal into a value of the deformation applied to the rolling bearing, a module for determining a compensation signal as a function of the deformation value, and an amplifier module configured to control at least one magnetic actuator rotatably supporting the shaft of the rotor and comprising at least one electromagnet, the amplifier module being configured to convert the compensation signal into a voltage signal to be transmitted to at least one electromagnet of the magnetic actuator, the magnetic actuator being configured to exert a force on the rotor shaft as a function of the voltage signal.

For example, the radial magnetic bearing comprises an annular core made from a ferromagnetic material mounted on the outer cylindrical surface of the rotor shaft and a stator core rigidly connected to the stator, the stator core comprising a stator magnetic circuit including at least one annular winding and a ferromagnetic body, and being placed radially facing the rotor core so as to define a radial air gap.

According to another embodiment, the system comprises at least two magnetic actuators. For example, the system comprises at least one radial magnetic bearing and/or one axial magnetic bearing.

Advantageously, the load sensor is positioned on the outer ring of the rolling bearing.

For example, the sensor is positioned on at least one element of the outer ring assembly, for example on the casing or on the outer ring. Advantageously, the sensor is positioned on the outer surface of the outer ring and/or on a lateral surface of the outer ring.

The load sensor can comprise at least one network of optical fibres, known as a fibre Bragg grating, delivering an input signal in the form of light.

According to one embodiment, the module for acquiring an input signal comprises an optical receiver or interrogator configured to inject or emit an optical signal into the optical fibre and receive an optical signal reflected by the optical fibre. The optical receiver is configured to convert the reflected optical signal into a wavelength.

Advantageously, the acquisition module further comprises a converter configured to convert the wavelength signal into a signal or value of the deformation applied to the rolling bearing.

In no way limitatively, provision could be made for the converter to also be configured to convert the deformation signal into a signal of the loads applied to the rolling bearing.

The sensor could be a strain gauge delivering an input signal in the form of a voltage.

According to another embodiment, the system comprises at least two load sensors positioned on the bearing.

For example, the sensors are respectively positioned in a corresponding groove made respectively on the outer surface and a lateral surface of the outer ring.

According to a second aspect, the invention relates to a rotating machine comprising a stator and a rotor comprising a shaft rotating about an axis of rotation and rotatably supported relative to the stator by at least one rolling bearing and by at least one magnetic bearing, the rotating machine comprising a system for compensating for the stresses applied to the bearing as described above.

When the magnetic bearing comprises a plurality of electromagnets each comprising one or more windings, each of the electromagnets receives a voltage signal through the control module of the magnetic bearing. Each of the electromagnets of the magnetic bearing thus receives a voltage signal that is specific to it.

BRIEF DESCRIPTION OF THE DRAWINGS

The present invention will be better understood on reading the detailed description of embodiments given by way of non-limiting example and illustrated by the attached drawings, in which.

DETAILED DESCRIPTION OF THE INVENTION

The terms "outer" and "inner" refer to the axis of rotation X-X of the bearings, the inner parts being closer to the axis of rotation than the outer parts.

Figure 1:
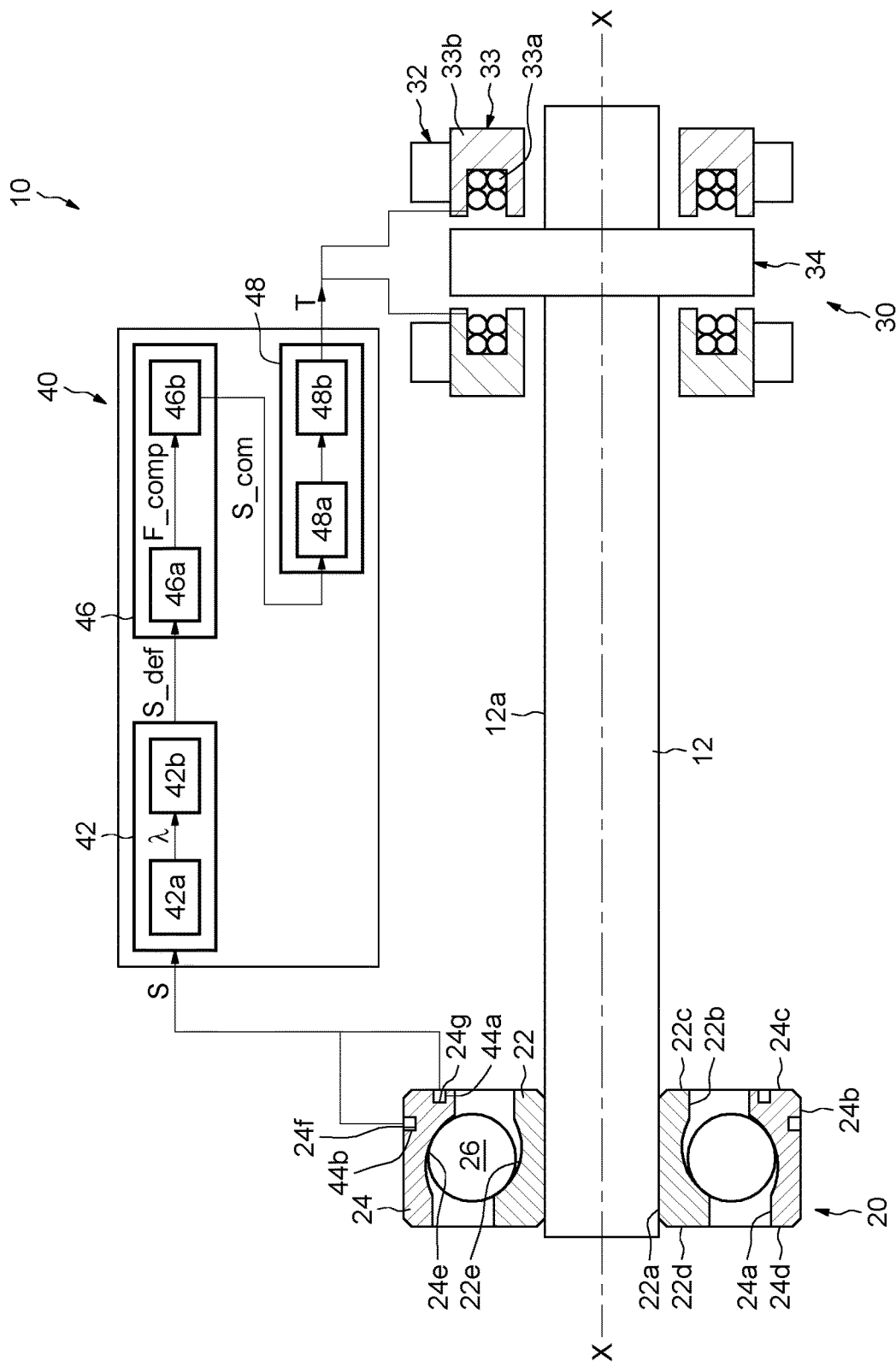
FIG. 1 is a partial cross-sectional view of a system for compensating for the loads applied to a rolling bearing supporting a shaft of a rotating machine according to a first embodiment of the invention.

FIG. 1 shows a rotating machine 10 comprising a stator (not shown) and a rotor 12 comprising a shaft rotating about the axis of rotation X-X. The rotor shaft 12 is rotatably supported relative to the stator by a rolling bearing 20 and by an axial magnetic bearing 30.

The rolling bearing 20 comprises an inner ring 22 rigidly connected to the cylindrical outer surface 12a of the rotor, an outer ring 24 and a plurality of rolling elements 26 positioned radially between the rings 22, 24.

The rolling elements 26 are in this case balls. As a variant, other types of rolling element could be envisaged, such as for example rollers, needles, etc. Two or more rows of rolling elements could also be envisaged.

The rolling elements 26 can be held circumferentially inside a cage (not shown).

As illustrated, the inner ring 22 is delimited radially by an inner cylindrical surface 22a and an outer cylindrical surface 22b and axially by two opposite frontal radial surfaces 22c, 22d.

The inner ring 22 includes, on its outer cylindrical surface 22b, a ring groove 22e forming a raceway for the rolling elements 26.

As illustrated, the outer ring 24 is delimited radially by an inner cylindrical surface 24a and an outer cylindrical surface 24b and axially by two opposite frontal radial surfaces 24c, 24d.

The inner cylindrical surface 24a of the outer ring 24 forms a ring groove 24e forming a raceway for the rolling elements 26.

The axial magnetic bearing 30 axially supports the rotor without physical contact. The axial magnetic bearing 30 comprises a stator core 32 and a rotor core 34 in the form of a disc rigidly connected to the rotor shaft 12. The stator core 32 comprises a stator magnetic circuit 33 comprising, as is conventional, one or more electromagnets 33a each including one or more annular windings 33a and a ferromagnetic body 33b surrounding the windings 33a.

The stator magnetic circuit 33 is placed axially facing the rotor core 34 with an axial air gap.

The rotating machine 10 further comprises a system 40 for compensating for the stresses applied to the rolling bearing 20.

The stress compensation system 40 comprises a module 42 for acquiring an input signal measured by two sensors 44a, 44b of the system. The acquisition module 42 comprises an optical receiver or interrogator configured to inject an optical signal and receive an optical signal reflected by the sensors 44a, 44b and convert them into a wavelength 2. The acquisition module 42 further comprises a converter 42b configured to convert the wavelength signal into a signal or value S_def of the deformation applied to the rolling bearing 20. In no way limitatively, provision could be made for the converter 42b to also be configured to convert the deformation signal S_def into a signal of the loads applied to the rolling bearing.

The values of the deformation and/or loads applied to the rolling bearing along one or more axes are thus obtained, for example the axial and/or radial deformation and/or loads. Provision could also be made to retrieve the deformation and/or load values along other axes.

As illustrated, the sensors 44a, 44b are respectively positioned in a corresponding groove 24f, 24g made respectively on the outer surface 24b and a lateral surface 24c of the outer ring 24. As a variant, the sensors could be positioned on another surface of the outer ring or on the inner ring. As a variant, the sensors could also be mounted in a casing (not shown) in which the outer ring 24 of the rolling bearing is mounted. Generally, the sensors could be mounted on an element of an outer ring assembly comprising the outer ring 24 and the casing in which the ring 24 is tightly mounted.

The sensors 44a, 44b comprise, for example, a network of optical fibres, known as a fibre Bragg grating. As a variant, another type of sensor could also be envisaged, such as for example strain gauges.

A different number of sensors could also be envisaged, for example a single sensor or a number of sensors greater than three.

If optical fibres are used as sensors, the acquisition module 42 receives an input signal S in the form of an optical signal that it firstly converts into a wavelength and then into a deformation signal S_def.

If strain gauges are used as sensors, the acquisition module 42 receives an input signal S in the form of a voltage that it converts into a deformation signal S_def.

The stress compensation system 40 further comprises a module 46 for determining a compensation signal as a function of the deformation or load values applied to the rolling bearing 20. The compensation signal determining module 46 comprises an electronic control unit 46a, or ECU, configured to receive the signal S_def coming from the acquisition module 42 and convert it into a force command F_com. The electronic control unit 46a can be a closed-loop control system such as a proportional—integral—derivative, or PID, controller, delivering for example an analogue or digital voltage signal as a force command.

The module 46 further comprises a converter 46b configured to convert the force command F_com into a compensation signal S_comp to be applied to the magnetic bearing 30. The compensation signal S_comp can be a current compensation signal or a flux compensation signal. Conversion into a compensation signal on the basis of a force command is known to a person skilled in the art and will not be described further.

The stress compensation system 40 further comprises an amplifier module 48.

The amplifier module 48 comprises a control module 48a configured to determine a duration of the pulses of a set of voltage signals T, known as pulse width modulation or PWM, to be transmitted to the electromagnets of the magnetic bearing 30 as a function of the compensation signal S_comp.

The amplifier module 48 further comprises a power module 48b configured to supply the necessary current to the electromagnets of the magnetic bearing 30 in order to apply this voltage T. Each of the electromagnets of the magnetic bearing thus receives a current depending on a voltage signal that is specific to it.

The voltage command transmitted to the axial magnetic bearing 30 makes it possible to generate an axial force on the rotor shaft 12 and thus reduce the axial load applied to the rolling bearing 20.

Figure 2:
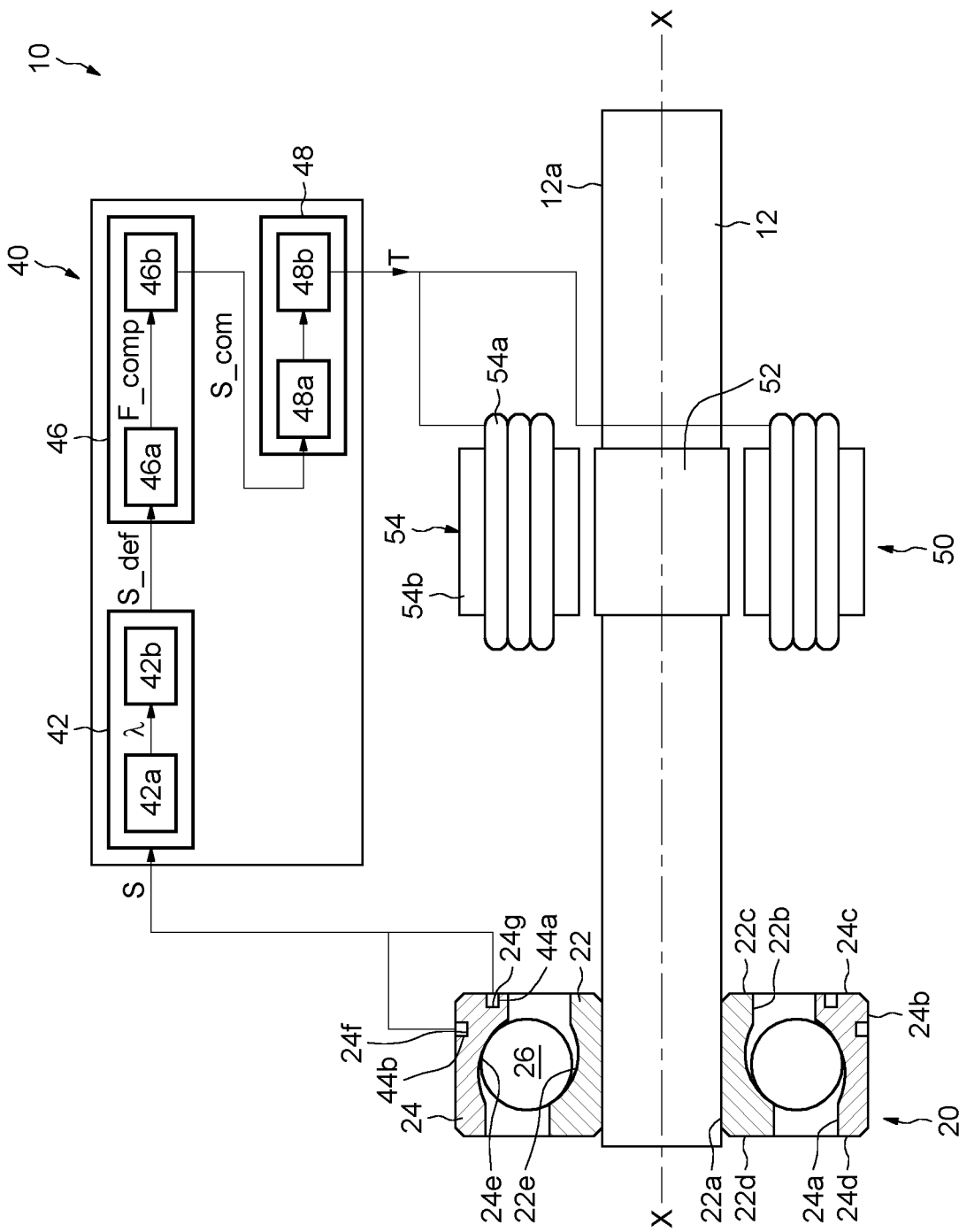
FIG. 2 is a partial cross-sectional view of a system for compensating for the loads applied to a rolling bearing supporting a shaft of a rotating machine according to a second embodiment of the invention.

The embodiment illustrated in FIG. 2, in which the same elements have the same reference signs, differs from the embodiment illustrated in FIG. 1 in that the rotor shaft 12 is supported by a rolling bearing 20 and by a radial magnetic bearing 50.

The radial magnetic bearing 50 radially supports the rotor shaft 12 without physical contact. The radial magnetic bearing 50 comprises an annular core 52 made from a ferromagnetic material mounted on the outer cylindrical surface 12a of the rotor shaft 12, made from a ferromagnetic material, and a stator core 54 rigidly connected to the stator. The stator core 54 comprises, as is conventional, a stator magnetic circuit including one or more electromagnets 54a each including one or more annular windings and a ferromagnetic body 54b, and is placed radially facing the rotor core 52 so as to define a radial air gap. The details of the core of the stator are not shown in the figure.

Similarly to the embodiment in FIG. 1, the rotating machine 10 further comprises a system 40 for compensating for the stresses applied to the rolling bearing 20.

The stress compensation system 40 comprises a module 42 for acquiring an input signal measured by two sensors 44a, 44b of the system. The acquisition module 42 comprises an optical receiver or interrogator configured to inject an optical signal and receive an optical signal reflected by the sensors 44a, 44b and convert them into a wavelength λ. The acquisition module 42 further comprises a converter 42b configured to convert the wavelength signal into a signal or value of the deformation S_def applied to the rolling bearing 20. In no way limitatively, provision could be made for the converter 42b to also be configured to convert the deformation signal S_def into a signal of the loads applied to the rolling bearing.

The values of the deformation and/or loads applied to the rolling bearing along one or more axes are thus obtained, for example the axial and/or radial deformation and/or loads. Provision could also be made to retrieve the deformation and/or load values along other axes.

As illustrated, the sensors 44a, 44b are respectively positioned in a corresponding groove 24f, 24g made respectively on the outer surface 24b and a lateral surface 24c of the outer ring 24. As a variant, the sensors could be positioned on another surface of the outer ring or on the inner ring. As a variant, the sensors could also be mounted in a casing (not shown) in which the outer ring 24 of the rolling bearing is mounted. Generally, the sensors could be mounted on an element of an outer ring assembly comprising the outer ring 24 and the casing in which the ring 24 is tightly mounted.

The sensors 44a, 44b comprise, for example, a network of optical fibres, known as a fibre Bragg grating. As a variant, another type of sensor could also be envisaged, such as for example strain gauges.

A different number of sensors could also be envisaged, for example a single sensor or a number of sensors greater than three.

If optical fibres are used as sensors, the acquisition module 42 receives an input signal S in the form of an optical signal that it firstly converts into a wavelength and then into a deformation signal S_def.

If strain gauges are used as sensors, the acquisition module 42 receives an input signal S in the form of a voltage that it converts into a deformation signal S_def.

The stress compensation system 40 further comprises a module 46 for determining a compensation signal as a function of the deformation or load values applied to the rolling bearing 20. The compensation signal determining module 46 comprises an electronic control unit 46a, or ECU, configured to receive the signal S_def coming from the acquisition module 42 and convert it into a force command F_com. The electronic control unit 46a can be a closed-loop control system such as a proportional—integral—derivative, or PID, controller, delivering for example an analogue or digital voltage signal as a force command.

The module 46 further comprises a converter 46b configured to convert the force command F_com into a compensation signal S_comp to be transmitted to the control module 48 in order to convert it into a voltage signal to be applied to the magnetic bearing 30. The compensation signal S_comp can be a current compensation signal or a flux compensation signal. Conversion into a compensation signal on the basis of a force command is known to a person skilled in the art and will not be described further.

The stress compensation system 40 further comprises an amplifier module 48.

The amplifier module 48 comprises a control module 48a configured to determine a duration of the pulses of a set of voltage signals T, known as pulse width modulation or PWM, to be transmitted to the electromagnets of the radial magnetic bearing 50 as a function of the compensation signal S_comp.

The amplifier module 48 further comprises a power module 48b configured to supply the necessary current to the electromagnets of the magnetic bearing 50 in order to apply this voltage T. Each of the electromagnets of the magnetic bearing thus receives a current depending on a voltage signal that is specific to it.

The voltage command transmitted to the radial magnetic bearing 50 makes it possible to generate a radial force on the rotor shaft 12 and thus reduce the radial load applied to the rolling bearing 20.

Figure 3:
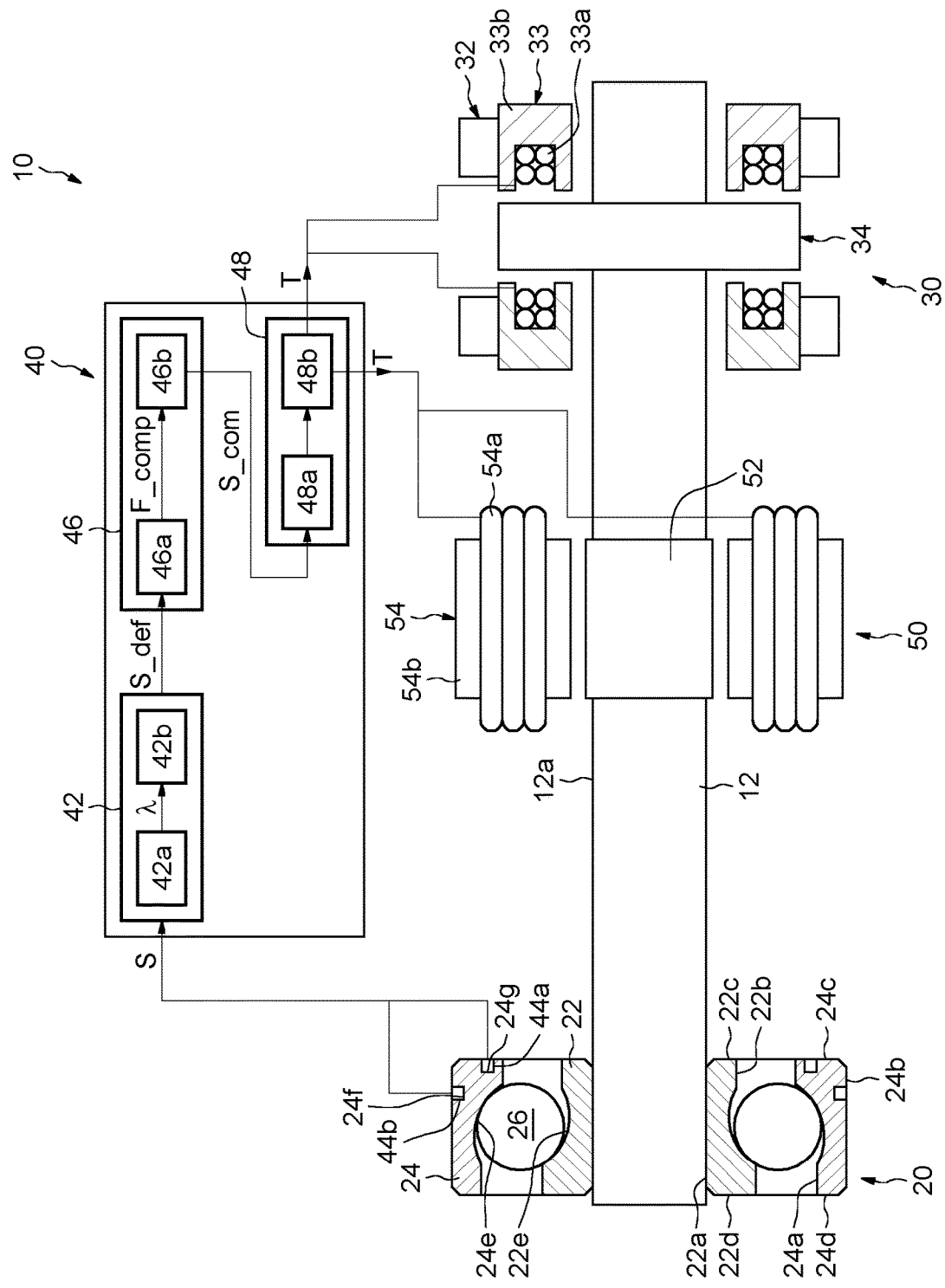
FIG. 3 is a partial cross-sectional view of a system for compensating for the loads applied to a rolling bearing supporting a shaft of a rotating machine according to a third embodiment of the invention.

The embodiment illustrated in FIG. 3, in which the same elements have the same reference signs, combines the use of an axial magnetic bearing 30 and a radial magnetic bearing 50 in order to compensate for the radial and axial stresses applied to the rolling bearing 20.

It will be noted that the invention is not limited to three configuration examples illustrated. The invention can apply to a shaft supported on one side by an instrumented rolling bearing associated with a magnetic bearing, for example radial, and supported on the opposite side by another instrumented rolling bearing also associated with a magnetic bearing, for example radial. It is also possible to envisage an axial magnetic bearing in the centre of the rotor the compensation force of which is based on the deformation measurements from the two instrumented bearings. For example, on the basis of the deformation of each bearing, it is possible to know the direction of the axial force. The deformation of the instrumented bearing situated on the side towards which the axial force is directed can then be used.

It can also be envisaged, in this configuration, that the compensation signal for each radial magnetic bearing is determined by using the deformation of both instrumented bearings simultaneously.

The invention could also apply to a shaft supported by two rolling bearings and a single radial magnetic bearing situated between the two rolling bearings, and one or both rolling bearings can be instrumented.

The invention could also apply to a shaft supported, on one side, by a roller bearing adjacent to a ball bearing associated with a radial magnetic bearing in order to use the deformation of the roller bearing and with an axial magnetic bearing in order to use the deformation of the ball bearing, and on the opposite side, by a second ball bearing associated with another axial magnetic bearing in order to use the deformation of the second ball bearing.

The invention makes it possible to compensate at least partially for the forces exerted on the rolling bearing. The service life of the rolling bearings is greatly improved.

The invention claimed is:

1. A system for compensating for the stresses applied to at least one bearing suitable for rotatably supporting a rotor shaft of a rotating machine relative to a stator of the machine, the system comprising:
    at least one sensor for measuring an input signal and positioned on at least one element of the bearing,
    a module for acquiring the input signal configured to convert the input signal into a value of the deformation applied to the rolling bearing,
    a module for determining a compensation signal as a function of the deformation value, and
    an amplifier module configured to control at least one magnetic actuator rotatably supporting the shaft of the rotor and comprising at least one electromagnet, the amplifier module being configured to convert the compensation signal into a voltage signal to be transmitted to the electromagnet of the magnetic actuator, the at least one magnetic actuator being configured to exert an axial force on the rotor shaft as a function of the voltage signal, the axial force compensating for external forces acting on the rotor shaft and reducing an axial load on the rotor shaft.

2. The system according to claim 1, wherein the amplifier module comprises a control module configured to determine a duration of the pulses of the voltage signal to be transmitted to the electromagnet of the magnetic actuator as a function of the compensation signal and a power module configured to supply the necessary current to the electromagnet of the magnetic actuator in order to apply the voltage.

3. The system according to claim 1, wherein the module for determining a compensation signal comprises an electronic control unit configured to receive the deformation value coming from the acquisition module and convert it into a force command, and a converter configured to convert the force command into a compensation signal.

4. The system according to claim 1, wherein the compensation signal is a current compensation signal or a flux compensation signal.

5. The system according to claim 1, wherein the magnetic actuator is an axial magnetic bearing axially supporting the rotor shaft.

6. The system according to claim 1, wherein the magnetic actuator is a radial magnetic bearing radially supporting the rotor shaft.

7. The system according to claim 1, further comprising at least two magnetic actuators.

8. The system according to claim 1, wherein the load sensor is positioned on an outer ring assembly of the bearing.

9. The system according to claim 1, wherein the load sensor comprises at least one network of optical fibres.

10. A rotating machine comprising:
    a stator, and
    a rotor comprising a shaft rotating about an axis of rotation and rotatably supported relative to the stator by at least one rolling bearing and by at least one magnetic bearing, the rotating machine comprising a system for compensating for the stresses applied to at least one bearing suitable for rotatably supporting a rotor shaft of a rotating machine relative to a stator of the machine, the system comprising:
- at least one sensor for measuring an input signal and positioned on at least one element of the bearing,
- a module for acquiring the input signal configured to convert the input signal into a value of the deformation applied to the rolling bearing,
- a module for determining a compensation signal as a function of the deformation value, and
- an amplifier module configured to control at least one magnetic actuator rotatably supporting the shaft of the rotor and comprising at least one electromagnet, the amplifier module being configured to convert the compensation signal into a voltage signal to be transmitted to the electromagnet of the magnetic actuator, the at least one magnetic actuator being configured to exert an axial force on the rotor shaft as a function of the voltage signal, the axial force compensating for external forces acting on the rotor shaft and reducing an axial load on the rotor shaft.

11. A system for compensating for the stresses applied to at least one bearing suitable for rotatably supporting a rotor shaft of a rotating machine relative to a stator of the machine, the system comprising:
- two optical sensors for measuring an input signal and positioned on an outer ring of the bearing, one of the optical sensors being located in a circumferential groove in a radially outer surface of the outer ring, the other of the optical sensors being located in an annular groove in an axial end of the outer ring,
- a module for acquiring the input signal configured to convert the input signal into a value of the deformation applied to the rolling bearing,
- a module for determining a compensation signal as a function of the deformation value, and
- an amplifier module configured to control at least one magnetic actuator rotatably supporting the shaft of the rotor and comprising at least one electromagnet, the amplifier module being configured to convert the compensation signal into a voltage signal to be transmitted to the electromagnet of the magnetic actuator, the at least one magnetic actuator being configured to exert a force on the rotor shaft as a function of the voltage signal.

12. The system according to claim 11, wherein the amplifier module comprises a control module configured to determine a duration of the pulses of the voltage signal to be transmitted to the electromagnet of the magnetic actuator as a function of the compensation signal and a power module configured to supply the necessary current to the electromagnet of the magnetic actuator in order to apply the voltage.

13. The system according to claim 11, wherein the module for determining a compensation signal comprises an electronic control unit configured to receive the deformation value coming from the acquisition module and convert it into a force command, and a converter configured to convert the force command into a compensation signal.

14. The system according to claim 11, wherein the compensation signal is a current compensation signal or a flux compensation signal.

15. The system according to claim 11, wherein the magnetic actuator is an axial magnetic bearing axially supporting the rotor shaft.

16. The system according to claim 11, wherein the magnetic actuator is a radial magnetic bearing radially supporting the rotor shaft.

17. The system according to claim 11, further comprising at least two magnetic actuators.

18. The system according to claim 11, wherein the load sensor comprises at least one network of optical fibres.

* * * * *